(12) United States Patent
Chifu

(10) Patent No.: US 8,405,647 B2
(45) Date of Patent: Mar. 26, 2013

(54) IMAGE INFORMATION DETECTING DEVICE

(75) Inventor: Hiroko Chifu, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 60 days.

(21) Appl. No.: 12/998,273

(22) PCT Filed: Oct. 16, 2008

(86) PCT No.: PCT/JP2008/068741
§ 371 (c)(1),
(2), (4) Date: Apr. 4, 2011

(87) PCT Pub. No.: WO2010/044159
PCT Pub. Date: Apr. 22, 2010

(65) Prior Publication Data
US 2011/0181566 A1    Jul. 28, 2011

(51) Int. Cl.
*G09G 5/00* (2006.01)

(52) U.S. Cl. .................................................. 345/207

(58) Field of Classification Search .............. 345/87, 345/102, 204, 207; 348/180, 184; 356/243.5, 356/243.8, 432; 382/274; 250/226
See application file for complete search history.

(56) References Cited

U.S. PATENT DOCUMENTS

| | | | |
|---|---|---|---|
| 6,320,652 B1 * | 11/2001 | Morimoto et al. | 356/124 |
| 6,459,485 B1 * | 10/2002 | Tsurutani | 356/432 |
| 6,674,424 B1 * | 1/2004 | Fujioka | 345/157 |
| 6,816,155 B1 * | 11/2004 | Ogawa | 345/207 |
| 6,853,387 B2 * | 2/2005 | Evanicky et al. | 345/690 |
| 2008/0204437 A1 * | 8/2008 | Jensen | 345/207 |
| 2008/0252629 A1 * | 10/2008 | Chiang | 345/207 |
| 2009/0179881 A1 * | 7/2009 | Hibi | 345/207 |
| 2009/0302175 A1 * | 12/2009 | Torii et al. | 248/122.1 |
| 2010/0259555 A1 * | 10/2010 | Hibi et al. | 345/601 |
| 2011/0074751 A1 * | 3/2011 | Jiang et al. | 345/207 |

FOREIGN PATENT DOCUMENTS

| | | |
|---|---|---|
| JP | 04-005537 | 1/1992 |
| JP | 08-292129 | 11/1996 |
| JP | 11-270136 | 10/1999 |
| JP | 2000-221109 | 8/2000 |
| JP | 2000-221110 | 8/2000 |
| JP | 2000-221113 | 8/2000 |
| JP | 2005-208548 | 8/2005 |

OTHER PUBLICATIONS

International Search Report (PCT/ISA/210).

* cited by examiner

*Primary Examiner* — Joe H Cheng
(74) *Attorney, Agent, or Firm* — McGinn IP Law Group, PLLC

(57) ABSTRACT

The present invention is directed to an image information detecting device that detects image light, and includes an image information detecting member that includes a detection surface having a light receiving sensor that detects image light, and a pressing member that is connected at one end thereof to the image information detecting member, and is provided so as to protrude from an other surface side which is opposite to the detection surface side.

5 Claims, 6 Drawing Sheets

IMAGE INFORMATION DETECTING DEVICE

TECHNICAL FIELD

The present invention relates to an image information detecting device used in the calibration (correction of brightness, color levels, and the like) of display devices such as liquid crystal displays.

BACKGROUND ART

In planar display devices utilizing a liquid crystal display or the like, calibration (correction of brightness, color levels, and the like) is performed by an image information detecting device.

For example, the adjustment device of a display system disclosed in Patent Document 1 includes a photometric portion that is provided facing a liquid crystal display portion, a measurement device that measures the image quality data (image information) by detecting a signal of the photometric portion, a storage device for storing predetermined ideal recorded image quality data, and a comparison device that compares the recorded image quality data and the measured image quality data that was measured and extracts the difference data, and the image quality of the liquid crystal display portion is adjusted based on the difference data that is calculated by the comparison device.

In Patent Document 1, the image information of the liquid crystal display portion is obtained by a light receiving sensor provided in the photometric portion. However, when the calibration is performed by utilizing such an image information detecting device, it is necessary to closely contact or fix the light receiving sensor to a specified position of the display surface of the liquid crystal display portion. In this regard, if a gap is formed between the image information detecting member and the display surface, the light from the surroundings is also sensed so that accurate information cannot be detected, and an accurate calibration cannot be carried out.

Specifically, as shown in FIG. 13, as an image information detecting device 50 that performs a calibration of display devices of the type disclosed in Patent Document 1, there is used one which is configured for example by an image information detecting member 52 including a light receiving sensor 52A that receives the image light emitted from the display surface 51A of the liquid crystal display device 51, a transmission cable 53 that transmits the image information detected by the image information detecting member 52, and a deadweight 54 provided in a midway of the transmission cable 53. Here, the end of the transmission cable 53 is connected to an output device (not shown in the drawing) such as a personal computer. Furthermore, the transmission cable 53 is suspended from the upper side of the liquid crystal display device 51.

In such an image information detecting device, the image information of the display surface 51A detected by the image information detecting member 52 is transmitted to the output device through the transmission cable, and analysis of the image information is performed at the output device.

Patent Document 1: Japanese Unexamined Patent Application, First Publication No. 2005-208548.

DISCLOSURE OF INVENTION

Problem to be Solved by the Invention

Incidentally, in an image information detecting device 50 of the type mentioned above, in the part where the light receiving sensor 52A of the image information detecting member 52 and the display surface 51A are in close contact, it is ideal to utilize a sponge-like material as a friction material for protection of the display surface 51A and to prevent slipping, and as a result, be positioned as shown by the dashed line.

However, as shown in FIG. 13, in a case where the display surface 51A of the liquid crystal display device 51 is maintained in a vertical (or a forward-inclined) position, even if a friction material is utilized, the light receiving sensor 52A of the image information detecting member 52 suspended by the transmission cable 53 as shown by the solid line, becomes a state in which it is separated from the display surface 51A, and it becomes easier for a gap 55 to form between the light receiving sensor 52A and the display surface 51A. Furthermore, since surrounding light enters the light receiving sensor 52A from the gap 55 formed here, a problem occurs in that accurate information cannot be detected.

In order to improve such a situation, as shown in FIG. 14, the display surface 51A of the liquid crystal display device 51 is inclined so that the light receiving sensor 52A of the image information detecting member 52 is made to closely contact the display surface 51A of the liquid crystal display device 51. However in a case where even this close contact is not sufficient, it is necessary for it to be constantly pressed, for example, by hand during detection of the image light such that light from the surroundings does not enter. Furthermore, there is a case in which separation of the light receiving sensor 52A from the display surface 51A is prevented by, for example, attaching a suction cup to the perimeter of the light receiving sensor 52A of the image information detecting member 52. However marks may remain on the display surface 51A, or the suction force of the suction cup declines due to repeated utilization, and in the same manner, the light receiving sensor 52A of the image information detecting member 52 becomes a state where it is separated from the display surface 51A, so that there is still a problem in which accurate image information can not be collected.

The present invention takes into consideration the above situation, and an object thereof is to provide, with a simple configuration, an image information detecting device of a display device in which the degree of contact between the light receiving sensor and the display surface of the display device (liquid crystal display portion) can be increased by making a force of the light receiving sensor of the image information detecting member act in the direction in which it contacts the display surface, and as a result, at the time of performing a calibration, the problem of the light receiving sensor separating from the display surface so that the detection of accurate information is no longer possible due to the effects of light from the surroundings is resolved, and detection of accurate image information can be performed.

Means for Solving the Problem

In order to achieve the object mentioned above, the present invention is directed to an image information detecting device that detects image light, and includes an image information detecting member that includes a detection surface having a light receiving sensor that detects image light, and a pressing member that is connected at one end thereof to the image information detecting member, and is provided so as to protrude from an other surface side which is opposite to the detection surface side.

REFERENCE SYMBOLS

Figure 1:
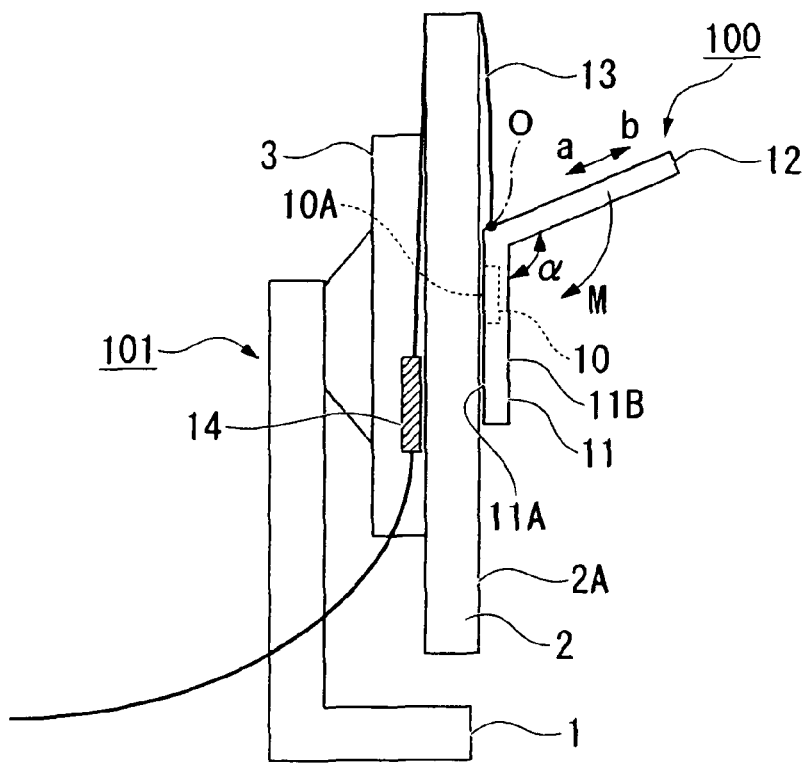
FIG. 1 is a side view showing an overall configuration with an image information detecting device according to an embodiment of the present invention arranged on a display device.

2A Display surface
10 Light receiving sensor
11 Image information detecting member
12 Pressing member
13 Transmission cable (suspending member)
14 Deadweight (balancing member)
100 Image information detecting device
101 Display device
O Suspending position

BEST MODE FOR CARRYING OUT THE INVENTION

Herein, an embodiment of the present invention is described with reference to the drawings. The embodiment described herein is exemplary of the embodiments of the present invention, and the present invention is in no way limited to this embodiment.

The object indicated by reference symbol 100 in FIG. 1 is an image information detecting device according to the present invention, and is provided on a display device indicated by reference symbol 101.

Firstly, the display device 101 is configured by a base 1, a liquid crystal display portion 2 that is fixed to the base 1 and has a display surface 2A on the front face, and a driving portion 3 that displays an image on the liquid crystal display portion 2. In a case where the base 1 is installed on a horizontal plane, the angle is adjusted such that the display surface 2A of the liquid crystal display portion 2 becomes perpendicular. Furthermore, in the present embodiment, the surface of the display surface 2A is not stepped, but is planar.

Figure 2:
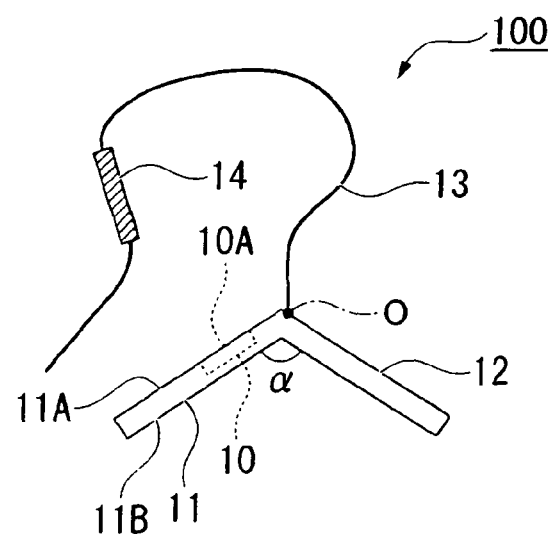
FIG. 2 is a side view showing details of a section provided with a light receiving sensor of the image information detecting device according to the embodiment of the present invention.

The image information detecting device 100, as shown in FIG. 1 and FIG. 2, includes: an image information detecting member 11 provided with a detection surface 10A having a light receiving sensor 10 that receives image light emitted from the display surface 2A of the liquid crystal display portion 2; a pressing member 12 (mentioned below) that is fixed to the base end portion (upper end portion in the drawing) of the image information detecting member 11, and produces a pressing force that presses the light receiving sensor 10 against the display surface 2A of the liquid crystal display portion 2; a transmission cable 13 that suspends the image information detecting member 11 and the pressing member 12, and transmits the image information detected by the image information detecting member 11; and a deadweight 14 (balancing member) that is provided in a midway of the transmission cable 13, and that has a weight that balances the image information detecting member 11 and the pressing member 12.

In such an image information detecting device 100, the deadweight 14 that balances the image information detecting member 11 and the pressing member 12 is provided in a midway of the transmission cable 13. Therefore as shown in FIG. 1, by suspending the transmission cable 13 from the upper side of the display device 101, and positioning the deadweight 14 on the back side of the display device 101, the image information detecting member 11 can be rested at a predetermined height of the display surface 2A of the liquid crystal display portion 2.

Furthermore, the end of the transmission cable 13 is connected to an output device (not shown in the drawing) such as a personal computer. In such an image information detecting device 100, the image information of the display surface 2A that is detected by the image information detecting member 11, is transmitted to the output device through the transmission cable 13, and analysis of the image information is performed in the output device.

In the present embodiment, the liquid crystal display portion 2 and the pressing member 12 are suspended by the transmission cable 13 serving as a suspending member. However this is not limiting, and it is acceptable for the liquid crystal display portion 2 and the pressing member 12 to be suspended by a suspending member such as a wire, and for it to be made separate from the transmission cable 13.

The light receiving sensor 10 is provided such that it lies in the plane of one surface 11A of the image information detecting member 11 serving as the detection surface 10A. Furthermore, the pressing member 12 is provided at the base end of the image information detecting member 11 such that it protrudes from the other surface 11B side on the opposite side to the one surface 11A serving as the detection surface 10A, and together with the image information detecting member 11 forms an overall letter V shape. Moreover, the transmission cable 13 is connected with the base end portion of the pressing member 12 to which the image information detecting member 11 is fixed, as a suspending position.

Due to such a pressing member 12, a pressing force is produced in the direction of the arrow M, due to the angular moment produced by the weight of the pressing member 12, with the suspending position of the transmission cable 13 as a fulcrum O, which presses the light receiving sensor 10 against the display surface 2A of the liquid crystal display portion 2. As a result, a force acts to make the detection surface 10A provided with the light receiving sensor 10 closely contact the display surface 2A of the liquid crystal display portion 2, so that the degree of contact between the light receiving sensor 10 and the display surface 2A of the liquid crystal display portion 2 can be increased.

In the image information detecting device 100 mentioned above, the suspending position of the transmission cable 13 with respect to the pressing member 12 is a fixed position represented by the fulcrum O. However it is in no way limited to this, and as shown by the arrows a-b in FIG. 1, it may be made positionally adjustable so as to approach and separate from the image information detecting member 11 along the length direction on the pressing member 12. As a result, for example even if a cover, which is called as a bezel, is present on the edge of the display surface 2A of the liquid crystal display portion 2, so that there is a position in which an incline is partially produced on the surface of the display surface 2A, by adjusting the suspending position (the position serving as the fulcrum O) of the transmission cable 13 in the length direction (arrow a-b direction) of the pressing member 12, the angular moment produced by the pressing member 12 is changed, and the angle between the detection surface 10A provided with the light receiving sensor 10, and the display surface 2A of the liquid crystal display portion 2, can be adjusted. As a result, the degree of contact of the light receiving sensor 10 against the display surface 2A of the liquid crystal display portion 2, which is partially inclined, can be further increased.

Figure 3:
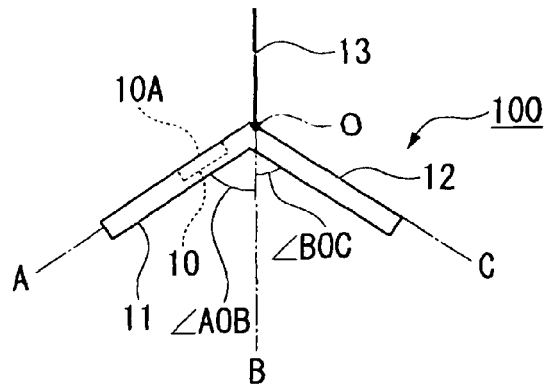
FIG. 3 is an explanatory diagram for explaining an angle between an image information detecting member and a pressing member in the image information detecting device according to the embodiment of the present invention.

FIG. 3 is a diagram showing a state when the image information detecting device 100 is suspended by the transmission cable 13. As shown in FIG. 3, in the image information detecting device 100 mentioned above, in a case where the end portion of the image information detecting member 11 on the end to which the pressing member 12 is not joined is denoted by reference symbol "A", the fulcrum serving as the suspending position of the transmission cable 13 is denoted by reference symbol "O", the position that lies on the extrapolated line of the suspended transmission cable 13 is denoted by reference symbol "B", and the end portion of the pressing member 12 on the end to which the image information detecting member 11 is not joined is denoted by reference symbol "C", the construction is such that the angle ($\angle AOB$) between the extrapolated line of the suspended transmission cable 13 (vertical direction of the fulcrum O) and the detection surface 10A provided with the light receiving sensor 10, and the angle ($\angle BOC$) between the extrapolated line of the suspended transmission cable 13 (vertical direction of the fulcrum O) and the pressing member 12 are equal, or is such that $\angle AOB$ is greater than $\angle BOC$. As a result, a pressing force is produced in the direction of arrow M shown in FIG. 1 that presses the light receiving sensor 10 against the display surface 2A of the liquid crystal display portion 2.

Figure 4:
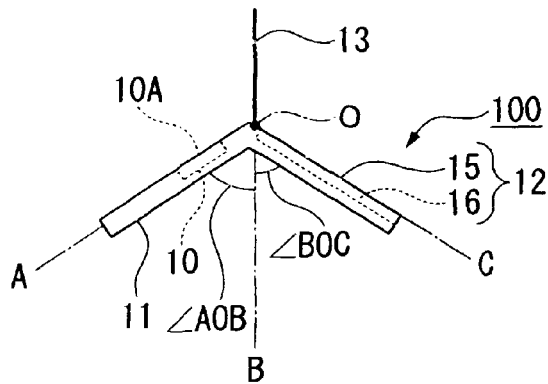
FIG. 4 is a side view of when a pressing member is in a stored state, in an image information detecting device according to a first modified example of the embodiment of the present invention.
Figure 5:
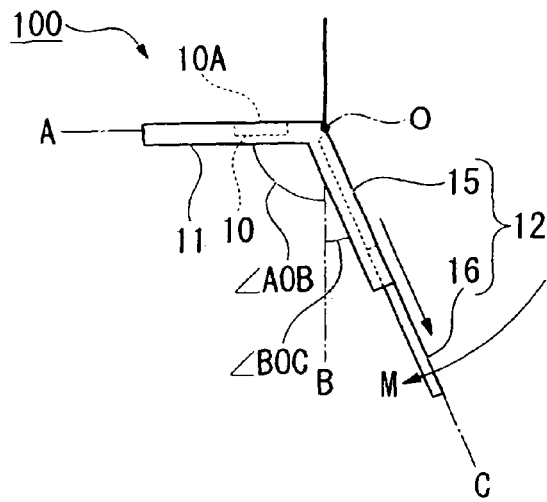
FIG. 5 is a side view of when the pressing member is in a state where it has slid and extended, in the image information detecting device according to the first modified example of the embodiment of the present invention.
Figure 6:
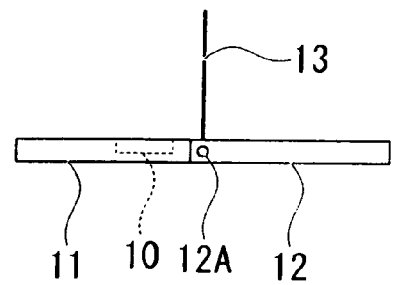
FIG. 6 is a side view showing a first state of an image information detecting device of a second modified example of the embodiment of the present invention.
Figure 7:
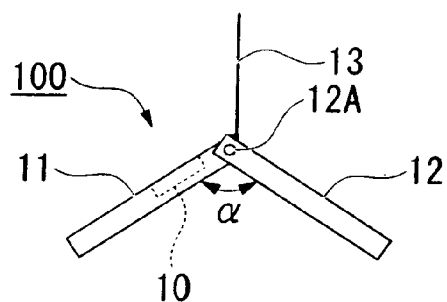
FIG. 7 is a side view showing a second state of the image information detecting device of the second modified example of the embodiment of the present invention.
Figure 8:
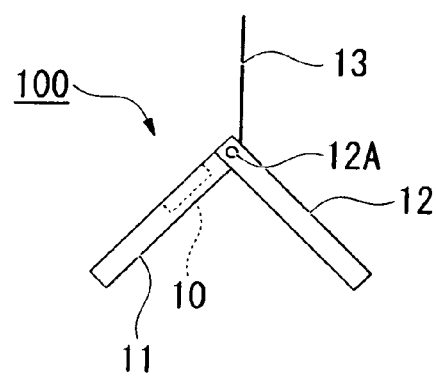
FIG. 8 is a side view showing a third state of the image information detecting device of the second modified example of the embodiment of the present invention.
Figure 9:
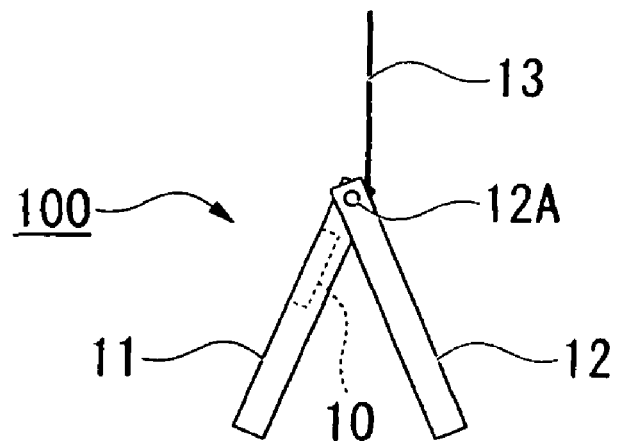
FIG. 9 is a side view showing a fourth state of the image information detecting device of the second modified example of the embodiment of the present invention.

However, the construction is in no way limited to this, and as shown in FIG. 4, the construction may be such that the pressing member 12 is configured by two members 15 and 16 that are slideable, and as shown in FIG. 5, the length thereof is changeable (extendable) by sliding these two members 15 and 16. When the length of the pressing member 12 is extended, even though the weight of the pressing member 12 is the same, the position of its center of gravity changes so that it becomes possible to produce an even greater rotational force that rotates the image information detecting member 11 in the direction of arrow M towards the display surface 2A of the liquid crystal display portion 2. Therefore, as shown in FIG. 4 and FIG. 5, $\angle AOB$ becomes greater than $\angle BOC$, and the pressing force of the light receiving sensor 10 against the display surface 2A of the liquid crystal display portion 2 can be made stronger. That is to say, by making the length of the pressing member 12 changeable, then compared to a pressing member (whose length cannot be changed) of the same weight, an even greater pressing force can be produced. Therefore as a result, the pressing member 12 can be made lighter while maintaining its center of gravity at the same position.

Figure 10:
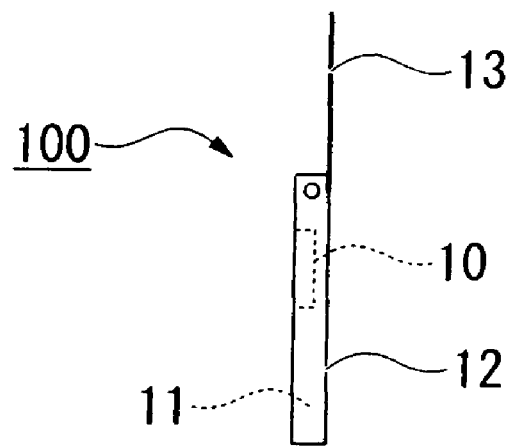
FIG. 10 is a side view showing a fifth state of the image information detecting device of the second modified example of the embodiment of the present invention.

Furthermore, with the pressing member 12 mentioned above, the angle ($\angle AOC=\alpha$) between the image information detecting member 11 and the pressing member 12 is fixed. However as shown from FIG. 6 to FIG. 10, the pressing member 12 may be provided such that it is freely rotatable with respect to the image information detecting member 11 by means of a rotation shaft 12A, and the angle ($\alpha$) is changeable such that it changes in sequence from FIG. 6, FIG. 7, FIG. 8, to FIG. 9. By adjusting the angle ($\alpha$), the pressing force of the light receiving sensor 10 towards the display surface 2A of the liquid crystal display portion 2 produced by the angular moment of the pressing member 12, is made an optimal value, and uneven pressing of the light receiving sensor 10 on the display surface 2A of the liquid crystal display portion 2 can be prevented. As a result, extreme load on the display surface 2A can be relieved. Furthermore, the angle ($\alpha$) between the image information detecting member 11 and the pressing member 12 is changeable. Therefore as shown in FIG. 10, it can be compactly folded when not being used, so that an effect such as becoming more convenient for portability, and further increasing the ease of use, can be obtained.

As described in detail above, in the image information detecting device 100 disclosed in the present embodiment, at a position on the opposite side to the detection surface 10A provided with the light receiving sensor 10, there is provided the pressing member 12 that extends in a direction away from the light receiving sensor 10. Therefore it is possible to produce a pressing force that presses the light receiving sensor 10 against the display surface 2A of the liquid crystal display portion 2 due to the angular moment produced by the pressing member 12, with the suspending position of the transmission cable 13 as the fulcrum O. As a result, a force acts in a direction to make the light receiving sensor 10 closely contact the display surface 2A of the liquid crystal display portion 2, so that the degree of contact between the light receiving sensor 10 and the display surface 2A of the liquid crystal display portion 2 can be increased. Hence, at the time of performing a calibration, the problem of the display surface 2A separating from the light receiving sensor 10, and accurate information not being able to be detected due to the effect of light from the surroundings, is solved, and it becomes possible to perform detection of accurate image information.

Furthermore, in the image information detecting device 100 of the present embodiment, the deadweight 14 with a weight that balances that of the image information detecting member 11 is provided in the midway of the transmission cable 13 as a balancing member. Therefore, by suspending the transmission cable 13 from the upper side of the display device 101, and positioning the deadweight 14 on the back side of the display device 101, the image information detecting member 11 can be rested at a predetermined height of the display surface 2A of the liquid crystal display portion 2.

Moreover, in the image information detecting device 100 of the present embodiment, by making the transmission cable 13 that suspends the image information detecting member 11, and the transmission cable that transmits the image information detected by the light receiving sensor 10 of the image information detecting member 11 the same, it is possible to simplify the configuration.

Figure 11:
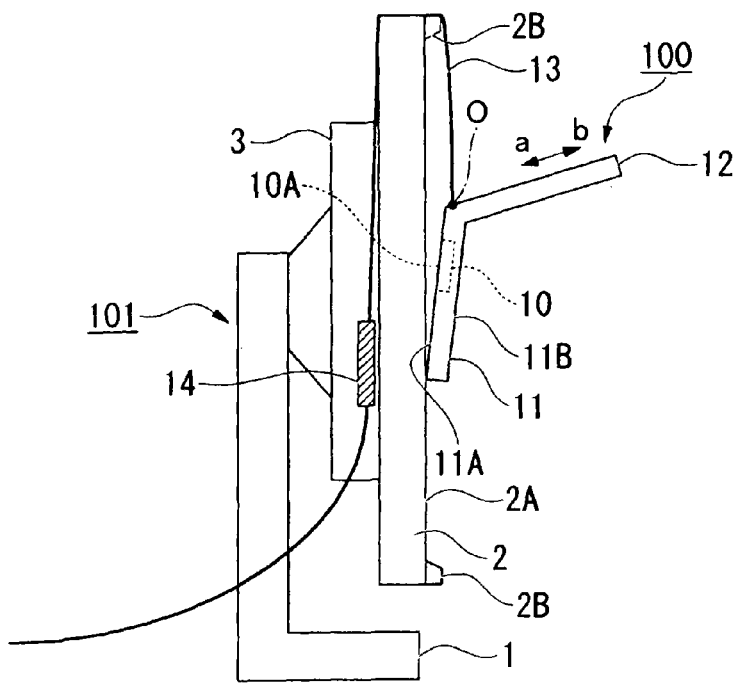
FIG. 11 is a side view showing an overall configuration with an image information detecting device according to a third modified example of the embodiment of the present invention arranged on a display device.
Figure 12:
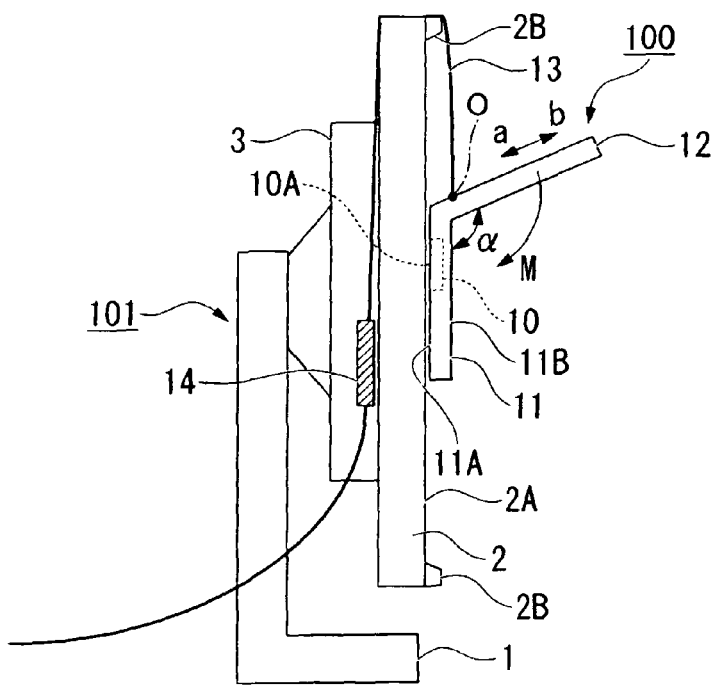
FIG. 12 is a side view showing a state in which the position of a transmission cable has been adjusted, in the image information detecting device according to the third modified example of the embodiment of the present invention.
Figure 13:
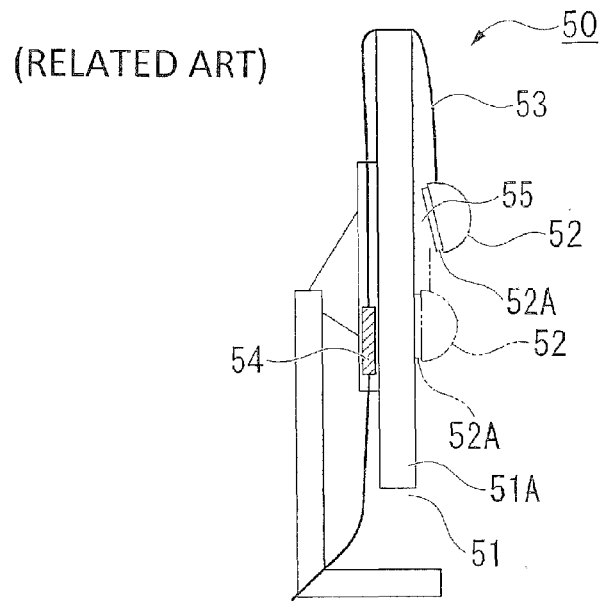
FIG. 13 is a side view showing a related image information detecting device.
Figure 14:
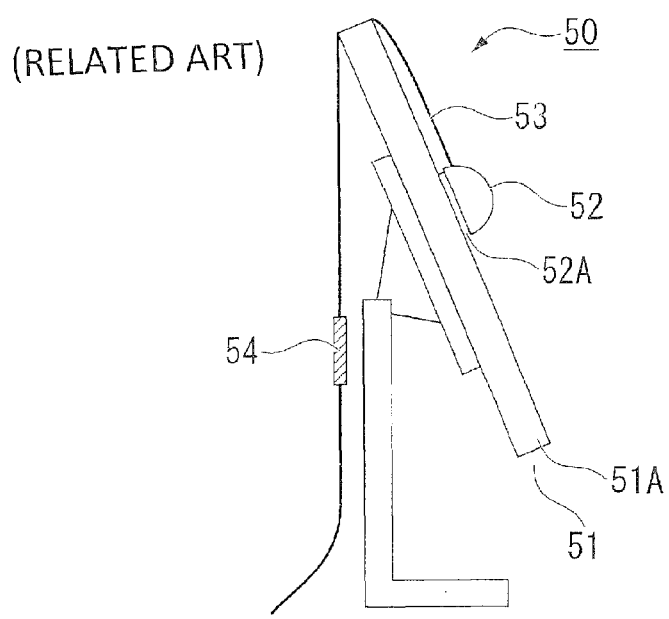
FIG. 14 is a side view showing a state with a conventional image information detecting device attached to a display surface of an inclined display device.

Here, as shown in FIG. 11, if there is a location in which an irregularity occurs on part of the display surface 2A and it is not planar, such as when there is a cover 2B, which is called as a bezel, on the edge of the display surface 2A of the liquid crystal display portion 2, then the display surface 2A of the liquid crystal display portion and the detection surface 10A provided with the light receiving sensor 10, may no longer be parallel. However, in the image information detecting device 100 of the present embodiment, the suspending position of the transmission cable 13 is provided such that it is positionally adjustable so as to approach and separate from the image information detecting member 11 in the length direction of the pressing member 12. Therefore as shown in FIG. 12, by adjusting the suspending position of the transmission cable 13 such that it is away from the image information detecting member 11, the angular moment produced by the pressing member 12 is changed, and while maintaining the center of gravity at the same position, it becomes possible to adjust the angle between the detection surface 10A provided with the light receiving sensor 10, and the display surface 2A of the liquid crystal display portion 2. As a result it becomes possible to increase the degree of contact of the light receiving sensor 10 against the display surface 2A of the liquid crystal display portion 2, which has an irregularity at a part thereof.

Furthermore, in the image information detecting device 100 of the present embodiment, the length of the pressing member 12 is made changeable. Therefore, when the length of the pressing member 12 is extended, the pressing force of the light receiving sensor 10 against the display surface 2A, which is produced by the angular moment of the pressing member 12, can be made greater. As a result, by making the length of the pressing member 12 changeable, the pressing member 12 can be made lighter while maintaining its center of gravity in the same position, and as a result, it becomes possible to make the entire device more lightweight.

Furthermore, in the image information detecting device 100 of the present embodiment, by appropriately changing the angle (α) between the image information detecting member 11 and the pressing member 12, the pressing force of the light receiving sensor 10 against the display surface 2A produced by the angular moment of the pressing member 12, is made an optimal value, and uneven pressing of the light receiving sensor 10 on the display surface 2A of the liquid crystal display portion 2 can be prevented. As a result, extreme load on the display surface 2A can be relieved. Furthermore, the angle between the image information detecting member 11 and the pressing member 12 is changeable. Therefore it can be compactly folded when not being used, so that an effect such as becoming more convenient for portability, and further increasing the ease of use, can be obtained.

In the embodiment mentioned above, a liquid crystal display device was used as the display device 101. However it is in no way limited to this, and a PDP (plasma display panel), an organic EL, electronic paper, and the like, or a substitute thereof, can be made the subject.

Furthermore, in the image information detecting device 100 mentioned above, the image information detecting member 11 is rested at a predetermined height of the display surface 2A of the liquid crystal display portion 2 by means of the deadweight 14 serving as a balancing member. However it is not essential to provide the deadweight 14, and it is acceptable if, for example, the image information detecting member 11 is retained at a predetermined height by hooking the transmission cable 13 serving as the suspending member, to the base 1 of the display device 101.

Above, the embodiment of the present invention has been explained in detail with reference to the drawings, although the specific configuration is in no way limited by this embodiment, and includes design changes and the like, within a range that does not depart from the scope of the present invention.

The invention claimed is:

1. An image information detecting device that detects image light, comprising:
   an image information detecting member that includes a first surface having a light receiving sensor that detects image light and a second surface opposite to the first surface;
   a pressing member that is connected at one end thereof to the image information detecting member, and is provided so as to protrude from the second surface of the image information detecting member and extend in a direction away from the first surface of the image information detecting member; and
   a suspending member that suspends the image information detecting member and the pressing member, at a suspending position adjustable so as to approach and separate from the image information detecting member.

2. The image information detecting device according to claim 1, wherein a length of the pressing member is changeable.

3. The image information detecting device according to claim 1, wherein a deadweight having a weight that balances that of the image information detecting member and the pressing member, is provided in a midway of the suspending member as a balancing member.

4. The image information detecting device according to claim 1, wherein the suspending member is a transmission cable that transmits image information detected by the light receiving sensor of the image information detecting member.

5. The image information detecting device according to claim 1, wherein a pressing force pressing the image information detecting member is produced due to an angular moment produced by the pressing member with the suspending position of the suspending member as a fulcrum.

* * * * *